(12) United States Patent
Xie et al.

(10) Patent No.: US 10,733,739 B2
(45) Date of Patent: Aug. 4, 2020

(54) METHOD AND SYSTEM FOR DISPLAYING TARGET IMAGE BASED ON ROBOT

(71) Applicant: Nanjing AvatarMind Robot Technology Co., Ltd., Nanjing (CN)

(72) Inventors: Yangyang Xie, Nanjing (CN); Changye Guo, Nanjing (CN)

(73) Assignee: Nanjing AvatarMind Robot Technology Co., Ltd., Nanjing (CN)

( * ) Notice: Subject to any disclaimer, the term of this patent is extended or adjusted under 35 U.S.C. 154(b) by 344 days.

(21) Appl. No.: 15/972,073

(22) Filed: May 4, 2018

(65) Prior Publication Data

US 2019/0102891 A1 Apr. 4, 2019

Related U.S. Application Data

(63) Continuation of application No. PCT/CN2017/110287, filed on Nov. 9, 2017.

(30) Foreign Application Priority Data

Sep. 29, 2017 (CN) .......................... 2017 1 0911965

(51) Int. Cl.
*G06K 9/00* (2006.01)
*G06T 7/246* (2017.01)
(Continued)

(52) U.S. Cl.
CPC ............ *G06T 7/248* (2017.01); *G05D 1/0246* (2013.01); *G06T 7/66* (2017.01); *G06T 7/74* (2017.01);
(Continued)

(58) Field of Classification Search
CPC .. G06T 7/248; G06T 7/74; G06T 7/66; G06T 2207/30204; G06T 2207/30241; G05D 1/0246; Y10S 901/01; Y10S 901/47
(Continued)

(56) References Cited

U.S. PATENT DOCUMENTS 8,116,527 B2 * 2/2012 Sabol ...................... G06T 7/254
                                                             348/61
8,934,672 B2 * 1/2015 Holeva .................... B66F 9/122
                                                             382/103

(Continued)

*Primary Examiner* — Jonathan S Lee

(57) ABSTRACT

The present disclosure provides a method and system for displaying a target image based on a robot. The method includes successively acquiring video frame images; when a following target in an acquired $k^{th}$-frame picture is detected, detecting information of a position of the following target in the $k^{th}$-frame picture; displaying the $k^{th}$-frame picture at a position of a $k+N+1^{th}$ frame in a time axis, and marking the position of the following target in the $k^{th}$-frame picture, N being a number of pictures acquired within a detection cycle; sequentially predicting positions of the following target in acquired $k+N+1^{th}$ to $k+2N-1^{th}$-frame pictures according to the position information of the following target in the $k^{th}$-frame picture; and sequentially displaying the $k+N+1^{th}$ to $k+2N-1^{th}$-frame pictures and the predicted positions of the following target at positions of the $k+N+2^{th}$ to $k+2N^{th}$ frames in the time axis.

16 Claims, 8 Drawing Sheets

(51) Int. Cl.
*G06T 7/73* (2017.01)
*G06T 7/66* (2017.01)
*G05D 1/02* (2020.01)

(52) U.S. Cl.
CPC ............... *G06T 2207/30204* (2013.01); *G06T 2207/30241* (2013.01); *Y10S 901/01* (2013.01); *Y10S 901/47* (2013.01)

(58) Field of Classification Search
USPC ........................................................ 382/103
See application file for complete search history.

(56) References Cited

U.S. PATENT DOCUMENTS

| | | | |
|---|---|---|---|
| 10,334,159 B2* | 6/2019 | Ueda | G06T 7/20 |
| 10,451,705 B2* | 10/2019 | Irie | G01S 3/7864 |
| 10,496,878 B2* | 12/2019 | Williams | G06K 9/6215 |
| 10,600,157 B2* | 3/2020 | Shoa Hassani Lashdan | G06T 7/30 |
| 10,628,961 B2* | 4/2020 | Sundaresan | G06K 9/00771 |
| 10,631,002 B2* | 4/2020 | Li | H04N 19/117 |
| 10,636,150 B2* | 4/2020 | Omari | B64C 39/024 |

* cited by examiner

METHOD AND SYSTEM FOR DISPLAYING TARGET IMAGE BASED ON ROBOT

CROSS-REFERENCE TO RELATED APPLICATIONS

This application is a continuation application of international patent application No. PCT/CN2017/110287, filed on Nov. 9, 2017, which is based upon and claims priority of Chinese Patent Application No. 201710911965.X, filed before Chinese Patent Office on Sep. 29, 2017 and entitled "METHOD AND SYSTEM FOR DISPLAYING TARGET IMAGE BASED ON ROBOT", the entire contents of which are incorporated herein by reference.

TECHNICAL FIELD

The present disclosure relates to the technical field of robots, and in particular, relates to a method and system for displaying a target image based on a robot.

BACKGROUND

With gradual development of artificial intelligence, robots are becoming commonplace in people's work and daily life. Therefore, how to improve interaction intelligence between robots and human beings becomes a hot subject for research at present.

The human body following technology, as a manner of man-machine interaction, has the advantages of convenience and high automation degree, and thus is widely used in robots that are capable of walking. Specifically, when implementing the human body following technology, the robot firstly acquires image signals by using an acquisition device such as a camera built in the robot, and the images including a human body are displayed on the display screen of the robot and the position of the human body is also marked thereon when the human body is detected in the acquired image signals, and the robot moves and follows the human body.

However, in the prior art, the speed of acquiring images by the robot is far higher than the speed of processing the images. As illustrated in FIG. 8, assume that after the first frame is processed by the detection module, the acquisition module has acquired the $n^{th}$-frame picture, and the system may display the detection result at the position of the $n+1^{th}$ frame in a time axis. To avoid missing of the following target, the detection module skips detection for the second to $n-1^{th}$ frame but directly starts detecting the content in the $n^{th}$ frame. After the $n^{th}$ frame is processed, the acquisition module has acquired the $2n-1^{th}$ frame, and the system displays the detection result at the position of the $2n^{th}$ frame in the time axis. Therefore, between the $n+1^{th}$ frame and the $2n-1^{th}$ frame in the time axis, the display module always displays the detection result of the first frame, and displays the detection result of the $n^{th}$ frame between the $2n^{th}$ frame and the $3n-2^{th}$ frame in the time axis. Accordingly, although the target is constantly moving within the vision range, the display module fails to timely follow the target but skips to the $n^{th}$ frame after successively displaying n-1 identical frames. Therefore, lagging (the display constantly maintains in the first frame) is present between the $n+1^{th}$ frame and the $2n-1^{th}$ frame in the time axis, and hopping (display of the first frame abruptly jumps to display of the $n^{th}$ frame) is present between the $2n-1^{th}$ frame and the $2n^{th}$ frame. Consequently, poor use experience is brought to the user.

Therefore, a method for more smoothly displaying images is desired, such that lagging and hopping may be prevented during the display, and good use experience may be given to the user.

SUMMARY

The present disclosure is intended to provide a method and system for displaying a target image based on a robot, which may solve the problem of lagging and hopping when a target image is displayed by the robot, such that the display is smoother and user experience is enhanced. The following technical solutions are employed.

A method for displaying a target image based on a robot is provided. The method includes the following steps: S10: successively acquiring video frame images; S20: when a following target in an acquired $k^{th}$-frame picture is detected, detecting information of a position of the following target in the $k^{th}$-frame picture; S30: displaying the $k^{th}$-frame picture in a $k+N+1^{th}$-frame picture in a time axis, and marking the position of the following target in the $k^{th}$-frame picture, N being a number of pictures acquired within a detection cycle; S40: sequentially predicting positions of the following target in acquired $k+N+1^{th}$ to $k+2N-1^{th}$-frame pictures according to the position information of the following target in the $k^{th}$-frame picture; and S50: sequentially displaying the $k+N+1^{th}$ to $k+2N-1^{th}$-frame pictures and the predicted positions of the following target in the $k+N+2^{th}$ to $k+2N^{th}$ frames in the time axis.

According to the present disclosure, the position of the following target may be predicted while the position of the following target in the picture is detected, which prevents the displayed following target is lagging due to a low detection speed. By predicting the position information of the following target in the picture, picture hopping due to a great change of the detected target position may be prevented, such that the displayed pictures including the following target are more contiguous.

, the sequentially predicting positions of the following target in acquired $k+N+1^{th}$ to $k+2N-1^{th}$-frame pictures according to the position information of the following target in the $k^{th}$-frame picture in step S40 includes: predicting the position of the following target in the $k+N+1^{th}$ frame picture according to the position of the following target in the $k^{th}$-frame picture, and predicting the position of the following target in the $k+N+i+1^{th}$-frame picture according to the position of the following target in the $k+N+i^{th}$-frame picture; wherein i is a positive integer in the range of 1 to N−2.

By using the recursive method, the position information of the $k+N+1^{th}$-frame picture may be predicted according to the position information of the $k^{th}$-frame picture, and the position information of the $k+N+2^{th}$-frame picture may be predicted according to the position information of the $k+N+1^{th}$-frame picture. In this way, by virtue of the recursive concept, the positions of the following target in the $k+N+1^{th}$ to $k+2N-1^{th}$-frame pictures may be predicted. By means of prediction, the positions of the $k^{th}$-frame picture and the target picture upon detection are prevented from being constantly displayed at the positions of the $k+N+2^{th}$ to the $k+2N^{th}$ frames, such that the displayed pictures are smoother and no lagging is present.

The method further includes: while displaying the $k^{th}$-frame picture in step S30, detecting the acquired $k+N^{th}$-frame picture, and upon step S50, displaying the $k+N^{th}$-frame picture and the detected position of the following target in the $k+2N+1^{th}$-frame picture in the time axis.

Since the prediction speed is higher than the detection speed, during prediction of the position of the following target in the $k+2N+1^{th}$ frame, the acquired $k+N^{th}$-frame picture is detected, and the $k+N^{th}$-frame picture and the detected position of the following target are displayed in the $k+2N+1^{th}$-frame picture in the time axis. In this way, a deviation during the prediction is timely corrected, such that the displayed picture satisfies a movement trajectory of the following target.

The predicting the position of the following target in the $k+N+1^{th}$-frame picture according to the position of the following target in the $k^{th}$-frame picture includes: S41: respectively calculating $k^{th}$ feature point information corresponding to the following target in the $k^{th}$-frame picture and $k+N+1^{th}$ feature point information corresponding to the following target in the acquired $k+N+1^{th}$-frame picture; S42: matching the $k^{th}$ feature point information with the $k+N+1^{th}$ feature point information to respectively obtain a $k^{th}$ feature point set and a $k+N+1^{th}$ feature point set; S43: calculating $k^{th}$ centroid information of the $k^{th}$ feature point set according to the $k^{th}$ feature point set, and calculating $k+N+1^{th}$ centroid information of the $k+N+1^{th}$ feature point set according to the $k+N+1^{th}$ feature point set; and S44: predicting the position of the following target in the $k+N+1^{th}$-frame picture according to the $k^{th}$ centroid information, the $k+N+1^{th}$ centroid information and central position information in the $k^{th}$-frame target picture information.

By acquiring the feature point of the following target in each frame of picture and calculating the position coordinates of each effective feature point, the coordinates of picture central position and the centroid coordinates of the following target, the position of the following target in the picture may be accurately predicted, thereby achieving the prediction objective.

The matching the $k^{th}$ feature point information with the $k+N+1^{th}$ feature point information to respectively obtain a $k^{th}$ feature point set and a $k+N+1^{th}$ feature point set in step S42 includes: S421: calculating a similarity between the $k^{th}$ feature point information and the $k+N+1^{th}$ feature point information according to a K neighbor consistency algorithm to obtain a corresponding matched point; and S422: filtering out an erroneous matched point according to a RANdom SAmple Consensus (RANSAC) algorithm to obtain the $k^{th}$ feature point set and the $k+N+1^{th}$ feature point set.

The feature point of each picture may be calculated according to the K neighbor consistency algorithm, and the erroneous matched point may be filtered out according to the RANSAC algorithm, such that the finally obtained feature point is highly effective, that the calculation during the prediction is more accurate, and that the predicted position of the following target is more accurate.

The calculating $k^{th}$ centroid information of the $k^{th}$ feature point set according to the $k^{th}$ feature point set, and calculating $k+N+1^{th}$ centroid information of the $k+N+1^{th}$ feature point set according to the $k+N+1^{th}$ feature point set in step S43 includes: S431: calculating pixel coordinates of all the feature points in the $k^{th}$-frame target picture information according to the $k^{th}$ feature point set, and calculating pixel coordinates of all the feature points in the $k+N+1^{th}$-frame picture information according to the $k+N+1^{th}$ feature point set; and S432: calculating $k^{th}$ centroid pixel coordinates as the $k^{th}$ centroid information according to the pixel coordinates of all the feature points in the $k^{th}$-frame target picture information, and calculating $k+N+1^{th}$ centroid pixel coordinates as the $k+N+1^{th}$ centroid information according to the pixel coordinates of all the feature points in the $k+N+1^{th}$-frame picture information.

In step S432, the $k^{th}$ centroid pixel coordinates are calculated based on the following formula:

$$C(k) = \frac{1}{i}\sum_{j=1}^{i} P(k)(j)$$

wherein $P(k)(j)$ denotes pixel coordinates of a $j^{th}$ feature point in the $k^{th}$ feature point set corresponding to the $k^{th}$-frame target picture, and $C(k)$ denotes the $k^{th}$ centroid pixel coordinates; and in step S432, the $k+N+1^{th}$ centroid pixel coordinates are calculated based on the following formula:

$$C(k+N+1) = \frac{1}{i}\sum_{j=1}^{i} P(k+N+1)(j)$$

wherein $P(k+N+1)(j)$ denotes pixel coordinates of a $j^{th}$ feature point in the $k+N+1^{th}$ feature point set corresponding to the $k+N+1^{th}$-frame picture information, and $C(k+N+1)$ denotes the $k+N+1^{th}$ centroid pixel coordinates.

Based on the above formula, the centroid coordinates of the following target may be calculated according to the pixel coordinates of the effective feature point of the following target in the picture, such that the predicted position of the following target in the picture is more accurate.

The predicting the position of the following target in the $k+N+1^{th}$-frame picture in step S44 includes: S441: calculating central position pixel coordinates in the $k^{th}$-frame target picture information as the central position information; and S442: calculating central position pixel coordinates in the $k+N+1^{th}$-frame picture information according to the $k^{th}$ centroid pixel coordinates, the $k+N+1^{th}$ centroid pixel coordinates and the central position pixel coordinates in the $k^{th}$-frame picture information based on the following formula:

$$R(k+N+1)=R(k)-C(k)+C(k+N+1)$$

wherein $R(k+N+1)$ denotes the central position pixel coordinates in the $k+N+1^{th}$-frame picture information, $R(k)$ denotes the central position pixel coordinates in the $k^{th}$-frame target picture information, $C(k)$ denotes the $k^{th}$ centroid pixel coordinates, and $C(k+N+1)$ denotes the $k+N+1^{th}$ centroid pixel coordinates.

According to the relative positions of the centroid position of the following target and the picture central coordinate position, the specific position of the following target at a next-frame picture may be predicted, such that the prediction is more accurate.

A system for displaying a target image based on a robot is provided. The system includes: an acquisition module, configured to successively acquire video frame images; a detection module, electrically connected to the acquisition module, and configured to: when a following target in an acquired $k^{th}$-frame picture is detected, detect information of a position of the following target in the $k^{th}$-frame picture; a display module, electrically connected to the detection module, and configured to display the $k^{th}$-frame picture at a $k+N+1^{th}$-frame in a time axis, and marking the position of the following target in the $k^{th}$-frame picture, N being a number of pictures acquired within a detection cycle; and a prediction module, electrically connected to the detection module, and configured to sequentially predict positions of the following target in acquired $k+N+1^{th}$ to $k+2N-1^{th}$-frame pictures according to the position information of the following target in the $k^{th}$-frame picture; wherein the display module is further configured to sequentially display the $k+N+1^{th}$ to $k+2N-1^{th}$-frame pictures and the predicted positions of the following target in the $k+N+2^{th}$ to $k+2N^{th}$-frame pictures in the time axis.

According to the present disclosure, the position of the following target may be predicted while the position of the following target in the picture is detected, which prevents the displayed following target is lagging due to a low detection speed. By predicting the position information of the following target in the picture, picture hopping due to a great change of the detected target position may be prevented, such that the displayed pictures including the following target are more contiguous.

The prediction module is further configured to predict the position of the following target in the $k+N+1^{th}$ frame according to the position of the following target in the $k^{th}$-frame picture, and predicting the position of the following target in the $k+N+i+1^{th}$ frame according to the position of the following target in the $k+N+1^{th}$ frame; wherein i is a positive integer in the range of 1 to N−2.

By using the recursive method, the position information of the $k+N+1^{th}$-frame picture may be predicted according to the position information of the $k^{th}$-frame picture, and the position information of the $k+N+2^{th}$-frame picture may be predicted according to the position information of the $k+N+1^{th}$-frame picture. In this way, by virtue of the recursive concept, the positions of the following target in the $k+N+1^{th}$ to $k+2N-1^{th}$-frame pictures may be predicted. By means of prediction, the positions of the $k^{th}$-frame picture and the target picture upon detection are prevented from being constantly displayed at the positions of the $k+N+2^{th}$ to $k+2N^{th}$ frames, such that the displayed pictures are smoother and no lagging is present.

The detection module is further configured to detect the acquired $k+N^{th}$-frame picture while displaying the $k^{th}$-frame picture; and the display module is further configured to display the $k+N^{th}$-frame picture and the detected position of the following target in the $k+2N+1^{th}$-frame picture in the time axis.

Since the prediction speed is higher than the detection speed, during prediction of the position of the following target in the $k+2N+1^{th}$ frame, the acquired $k+N^{th}$-frame picture is detected, and the $k+N^{th}$-frame picture and the detected position of the following target are displayed in the $k+2N+1^{th}$-frame picture in the time axis. In this way, a deviation during the prediction is timely corrected, such that the displayed picture satisfies a movement trajectory of the following target.

The prediction module includes: a calculation submodule, configured to respectively calculate $k^{th}$ feature point information corresponding to the following target in the $k^{th}$-frame picture and $k+N+1^{th}$ feature point information corresponding to the following target in the acquired $k+N+1^{th}$-frame picture; a matching submodule, electrically connected to the calculation submodule, and configured to match the $k^{th}$ feature point information with the $k+N+1^{th}$ feature point information to respectively obtain a $k^{th}$ feature point set and a $k+N+1^{th}$ feature point set; wherein the calculation submodule is further configured to calculate $k^{th}$ centroid information of the $k^{th}$ feature point set according to the $k^{th}$ feature point set, and calculating $k+N+1^{th}$ centroid information of the $k+N+1^{th}$ feature point set according to the $k+N+1^{th}$ feature point set; and a prediction submodule, configured to predict $k+1^{th}$-frame target prediction picture information according to the $k^{th}$ centroid information, the $k+N+1^{th}$ centroid information and central position information in the $k^{th}$-frame target picture information.

By acquiring the feature point of the following target in each frame of picture and calculating the position coordinates of each effective feature point, the coordinates of picture central position and the centroid coordinates of the following target, the position of the following target in the picture may be accurately predicted, thereby achieving the prediction objective.

The matching submodule includes: a picture processing unit, configured to calculate a similarity between the $k^{th}$ feature point information and the $k+N+1^{th}$ feature point information according to a K neighbor consistency algorithm to obtain a corresponding matched point; wherein the picture processing unit is further configured to filter out an erroneous matched point according to a RANdom SAmple Consensus (RANSAC) algorithm to obtain the $k^{th}$ feature point set and the $k+N+1^{th}$ feature point set.

The feature point of each picture may be calculated according to the K neighbor consistency algorithm, and the erroneous matched point may be filtered out according to the RANSAC algorithm, such that the finally obtained feature point is highly effective, that the calculation during the prediction is more accurate, and that the predicted position of the following target is more accurate.

The calculation submodule is further configured to calculate pixel coordinates of all the feature points in the $k^{th}$-frame target picture information according to the $k^{th}$ feature point set, and calculate pixel coordinates of all the feature points in the $k+N+1^{th}$-frame picture information according to the $k+N+1^{th}$ feature point set; and the calculation submodule is further configured to calculate $k^{th}$ centroid pixel coordinates as the $k^{th}$ centroid information according to the pixel coordinates of all the feature points in the $k^{th}$-frame target picture information, and calculate $k+N^{th}$ pixel coordinates as the $k+N+1^{th}$ centroid information according to the pixel coordinates of all the feature points in the $k+N+1^{th}$-frame picture information.

The calculation submodule is further configured to calculate the $k^{th}$ centroid pixel coordinates according to the following formula:

$$C(k) = \frac{1}{i}\sum_{j=1}^{i} P(k)(j)$$

wherein $P(k)(j)$ denotes pixel coordinates of a $j^{th}$ feature point in the $k^{th}$ feature point set corresponding to the $k^{th}$-frame target picture, and $C(k)$ denotes the $k^{th}$ centroid pixel coordinates.

The calculation submodule is further configured to calculate the $k+N+1^{th}$ centroid pixel coordinates based on the following formula:

$$C(k+N+1) = \frac{1}{i}\sum_{j=1}^{i} P(k+N+1)(j)$$

wherein $P(k+N+1)(j)$ denotes pixel coordinates of a $j^{th}$ feature point in the $k+N+1^{th}$ feature point set corresponding to the k+N+1$^{th}$-frame picture information, and C(k+N+1) denotes the k+N+1$^{th}$ centroid pixel coordinates.

According to the relative positions of the centroid position of the following target and the picture central coordinate position, the specific position of the following target at a next-frame picture may be predicted, such that the prediction is more accurate.

The calculation submodule is further configured to calculate central position pixel coordinates in the k$^{th}$-frame target picture information as the central position information;

the calculation submodule is further configured to calculate central position pixel coordinates in the k+N+1$^{th}$-frame picture information according to the k$^{th}$ centroid pixel coordinates, the k+N+1$^{th}$ centroid pixel coordinates and the central position pixel coordinates in the k$^{th}$-frame picture information based on the following formula:

$$R(k+N+1)=R(k)-C(k)+C(k+N+1)$$

wherein R(k+N+1) denotes the central position pixel coordinates in the k+N+1$^{th}$-frame picture information, R(k) denotes the central position pixel coordinates in the k$^{th}$-frame target picture information, C(k) denotes the k$^{th}$ centroid pixel coordinates, and C(k+N+1) denotes the k+N+1$^{th}$ centroid pixel coordinates.

According to the relative positions of the centroid position of the following target and the picture central coordinate position, the specific position of the following target at a next-frame picture may be predicted, such that the prediction is more accurate.

The method and system for displaying a target image based on a robot according to the present disclosure achieve the following beneficial effects:

Display lagging of the follow system is solved. In the prior art, due to restrictions of the hardware of the robot, the detection speed of the robot is far lower than the acquisition speed, and as a result, lagging or hopping of the image frequently occurs when the robot displays the pictures of the following target. By virtue of the prediction function according to the present disclosure, the image for display may be predicted during the detection, such that the displayed image is smoother, and lagging is prevented.

BRIEF DESCRIPTION OF THE DRAWINGS

The above characteristics, technical features, advantages and implementation manners of a method and system for displaying a target image based on a robot according to the present disclosure are described in a simple and more understandable manner by virtue of illustrating preferred embodiments with reference to the accompanying drawings.

REFERENCE NUMERALS AND DENOTATIONS THEREOF

Figure 1:
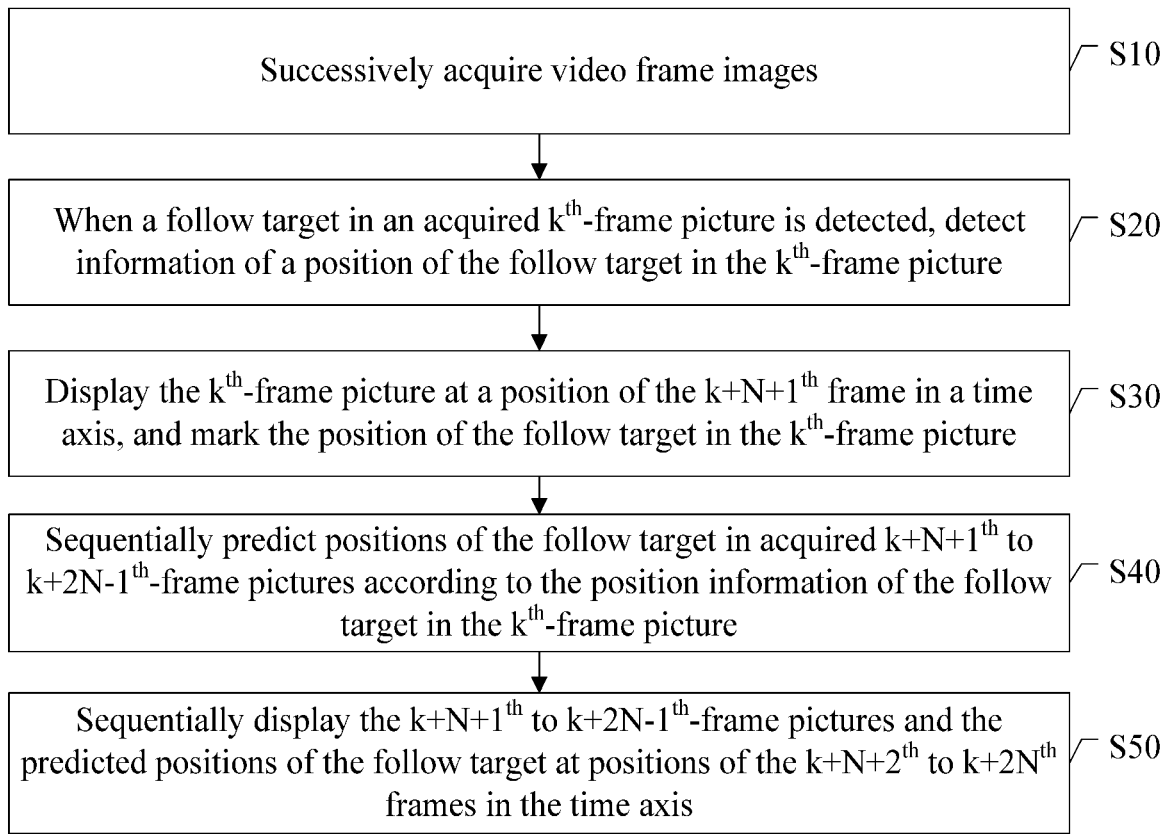
FIG. 1 is a flowchart of a method for displaying a target image based on a robot according to one embodiment of the present disclosure.

1—acquisition module, 2—detection module, 3—prediction module, 4—display module, 31—calculation submodule, 32—matching submodule, 33—prediction submodule, 321—picture processing unit.

DETAILED DESCRIPTION

For clearer description of the technical solutions in the embodiments of the present disclosure or the prior art, the specific embodiments of the present disclosure are described hereinafter with reference to the accompanying drawings. Apparently, the accompanying drawings described hereinafter only illustrate some embodiments of the present disclosure. Persons of ordinary skill in the art would derive other accompanying drawings and other embodiments based on these accompanying drawings, without paying any creative effort.

For brevity, parts relevant to the present disclosure are merely illustrated in the drawings, and these parts do not denote the actual structure of the product. In addition, for brevity and ease of understanding, with respect to parts having the same structure or function in the drawings, only one of these parts is illustratively drawn in the drawings, or only one of these parts is marked. In this context, "a" or "one" does not merely denote "only one" but may also denotes "more than one".

As illustrated in FIG. 1, the present disclosure provides one embodiment illustrating a method for displaying a target image based on a robot. The method includes:

S10: successively acquiring video frame images;

S20: when a following target in an acquired k$^{th}$-frame picture is detected, detecting information of a position of the following target in the k$^{th}$-frame picture;

S30: displaying the k$^{th}$-frame picture at a position of a k+N+1$^{th}$ frame in a time axis, and marking the position of the following target in the k$^{th}$-frame picture, N being the number of pictures acquired within a detection cycle;

S40: sequentially predicting positions of the following target in acquired k+N+1$^{th}$ to k+2N−1$^{th}$-frame pictures according to the position information of the following target in the k$^{th}$-frame picture; and S50: sequentially displaying the k+N+1$^{th}$ to k+2N−1$^{th}$-frame pictures and the predicted positions of the following target at positions of the k+N+2$^{th}$ to k+2N$^{th}$ frames in the time axis.

This embodiment may be applied to a robot having the target follow function, for example, a robot having the human body follow function. For ease of understanding, in this embodiment, the value of k is 1, that is, detection starts from the k$^{th}$-frame picture. Since different robots have different performances, the amount of picture information acquired in a detection cycle is also different, and the number N of pictures acquired in a detection cycle also varies. That is, N may be the number of pictures acquired within a detection cycle. For ease of differentiation, in this embodiment, the acquired pictures are referred to as picture information, and the processed and the displayed pictures are referred to as target picture information.

In this embodiment, when k=1, it indicates that the detection starts from the detected first-frame picture including the following target. Specifically, the robot may be provided with a camera which is used to acquire images of the following target. When the following target appears within the view range of the robot, the robot starts successively acquiring images including the following target. When first-frame picture information is acquired, detection is performed for the acquired first-frame picture information. Since the detection speed is far lower than the picture acquisition speed, after the first-frame picture information is detected, the robot has acquired the N+2$^{th}$-frame picture. In this case, the robot may display the successfully detected first-frame picture information at the position of the N+2$^{th}$ frame in the time axis.

Figure 8:
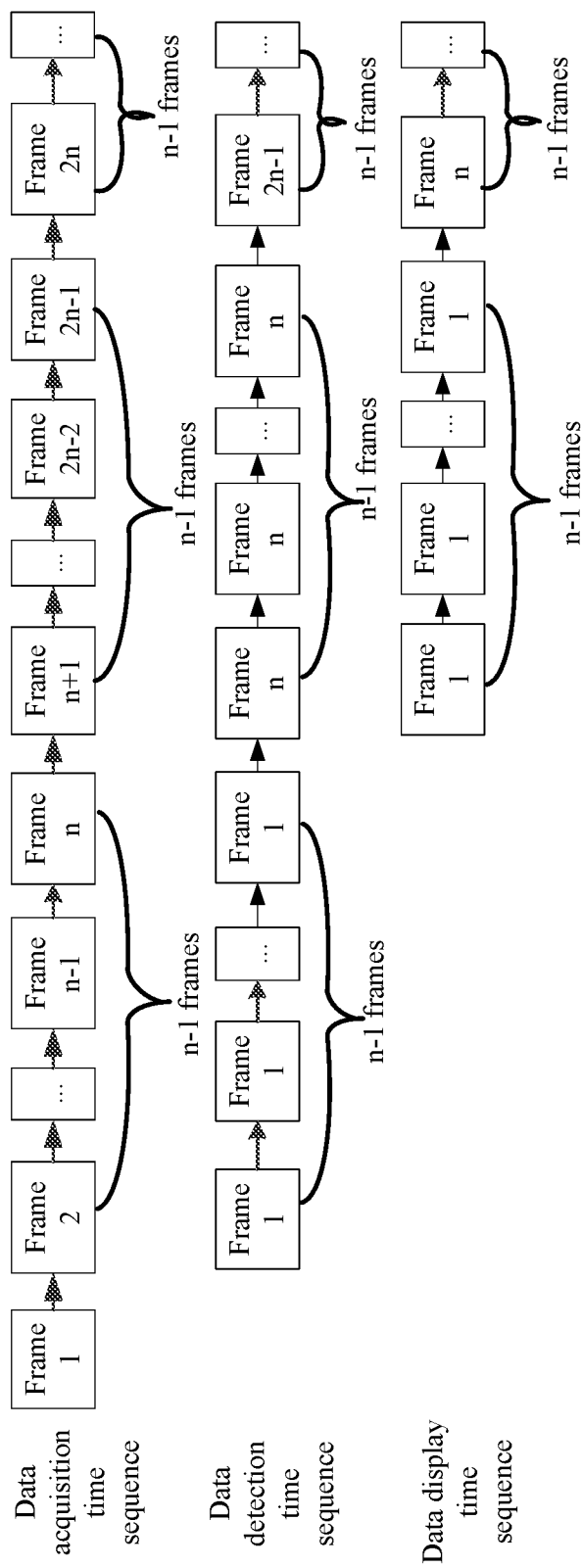
FIG. 8 is a time sequence flowchart of a method for displaying a target image in a robot according to the prior art.

As illustrated in FIG. 8, generally in this case, the acquired n$^{th}$-frame picture is continuously detected, and then displayed in the 2n$^{th}$ frame. As such, the first-frame picture, instead of the pictures in the n+1$^{th}$ to 2n−1$^{th}$ frames, is always displayed in the n+1$^{th}$ to 2n−1$^{th}$ frames, such that lagging of the display occurs. When it comes to the 2n$^{th}$ frame, a new picture is displayed, such that image hopping occurs which severely affects visual experience of the user.

In view of the above, this embodiment provides a prediction function. The robot successively acquires the picture information, and step S40 is performed after the first-frame picture information is detected and displayed successfully, that is, when step S30 is completed. The second-frame target picture information and the position of the following target is predicted according to the detected first-frame target picture information and the position of the following target, and the acquired N+1$^{th}$-frame picture information. The second-frame target picture information and the position of the following target are displayed at the position of the N+2$^{th}$ frame in the time axis. By repeated implementing the above prediction function, the 3$^{rd}$-frame target picture information may be obtained, until the 2N−1$^{th}$-frame picture information and the position of the following target are predicted and displayed.

Figure 9:
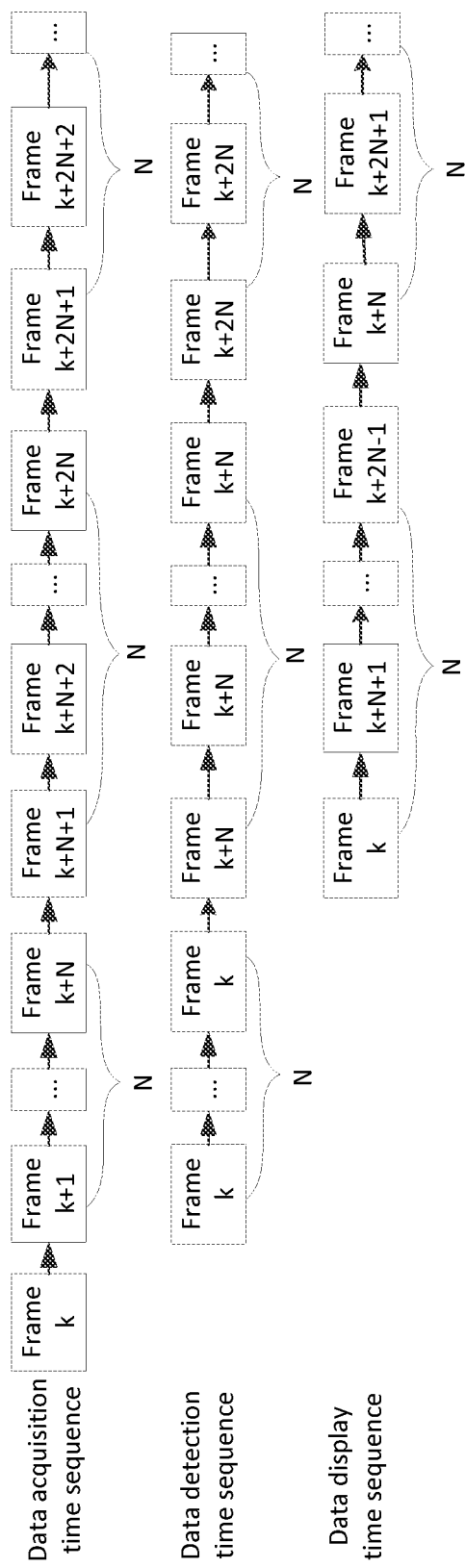
FIG. 9 is a time sequence flowchart of a method for displaying a target image based on a robot according to one embodiment of the present disclosure.

As illustrated in FIG. 9, when the k$^{th}$-frame picture including the following target is acquired, the position of the following target in the k$^{th}$-frame picture is detected. Upon completion of the detection, the k$^{th}$-frame picture and the position of the following target are displayed in the k+N+1$^{th}$ frame in the time axis, the positions of the following target in the acquired k+N+1$^{th}$ to k+2N−1$^{th}$-frame pictures are sequentially predicted, and the k+N+1$^{th}$ to k+2N−1$^{th}$-frame pictures and the predicted position of the following target are sequentially displayed in the k+N+2$^{th}$ to k+2N$^{th}$ frames in the time axis. By virtue of the prediction function according to this embodiment, the hopping and lagging in the prior art may be overcome.

Specifically, assume that detecting and processing each frame needs a cycle N, the detection starts from the k$^{th}$ frame and finally the following target is detected; then after the k$^{th}$ frame is detected at the position of the k+N$^{th}$ frame, the k$^{th}$ frame is displayed at the position of the k+N+1$^{th}$ frame; and afterwards the k+N+1$^{th}$ to k+2N−1$^{th}$-frame pictures are sequentially displayed at the positions of the k+N+2$^{th}$ to k+2N$^{th}$ frames, the position of the following target in the k+N+1$^{th}$ frame is predicted according to the position of the following target in the k$^{th}$ frame, and the position of the following target in the k+N+2$^{th}$ frame is predicted according to the predicted position of the following target in the k+N+1$^{th}$ frame, until the position of the following target in the k+2N−1$^{th}$ frame is predicted; finally, the detection of the k+N$^{th}$ frame is completed, and the k+2N$^{th}$-frame picture and the position of the following target are displayed at the position of the k+2N+1$^{th}$ frame.

Figure 2:
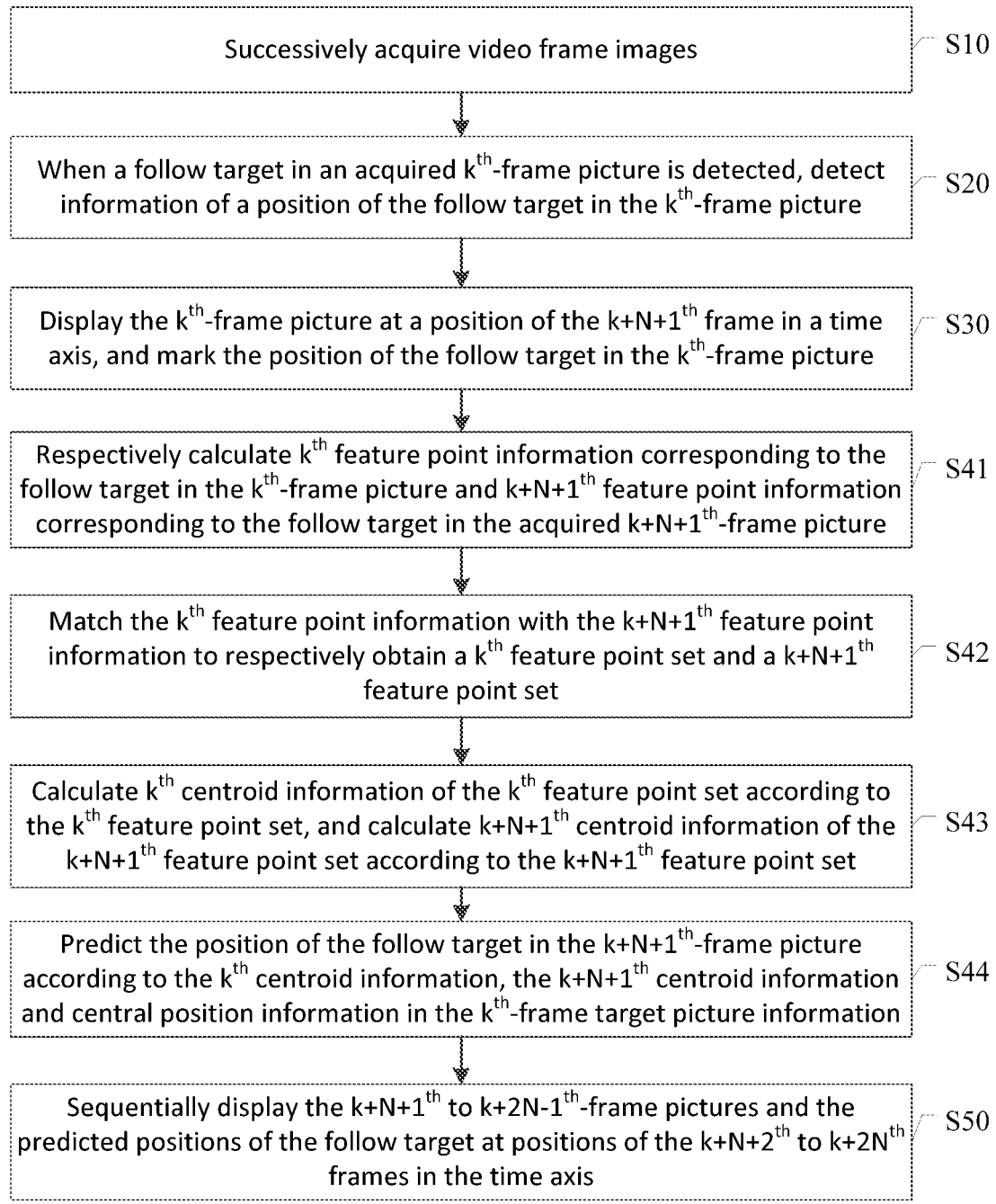
FIG. 2 is a flowchart of a method for displaying a target image based on a robot according to another embodiment of the present disclosure.

As illustrated in FIG. 2, the present disclosure provides another embodiment illustrating a method for displaying a target image based on a robot. The method includes:

S10: successively acquiring video frame images;

S20: when a following target in an acquired k$^{th}$-frame picture is detected, detecting information of a position of the following target in the k$^{th}$-frame picture;

S30: displaying the k$^{th}$-frame picture at a position of the k+N+1$^{th}$ frame in a time axis, and marking the position of the following target in the k$^{th}$-frame picture, N being the number of pictures acquired within a detection cycle;

S41: respectively calculating k$^{th}$ feature point information corresponding to the following target in the k$^{th}$-frame picture and k+N+1$^{th}$ feature point information corresponding to the following target in the acquired k+N+1$^{th}$-frame picture;

S42: matching the k$^{th}$ feature point information with the k+N+1$^{th}$ feature point information to respectively obtain a k$^{th}$ feature point set and a k+N+1$^{th}$ feature point set;

S43: calculating k$^{th}$ centroid information of the k$^{th}$ feature point set according to the k$^{th}$ feature point set, and calculating k+N+1$^{th}$ centroid information of the k+N+1$^{th}$ feature point set according to the k+N+1$^{th}$ feature point set;

S44: predicting the position of the following target in the k+N+1$^{th}$-frame picture according to the k$^{th}$ centroid information, the k+N+1$^{th}$ centroid information and central position information in the k$^{th}$-frame target picture information;

S50: sequentially displaying the k+N+1$^{th}$ to k+2N−1$^{th}$-frame pictures and the predicted positions of the following target at positions of the k+N+2$^{th}$ to k+2N$^{th}$ frames in the time axis.

In this embodiment, how to predict the position of the following target in the acquired k+N+1$^{th}$-frame picture according to the detected k$^{th}$-frame target picture information and the position of the following target is specifically described. Firstly, some conventional methods for processing feature points in pictures are employed to respectively calculate the k$^{th}$ feature point information corresponding to the position of the following target in the k$^{th}$-frame target picture and the k+N+1$^{th}$ feature point information corresponding to the position of the following target in the acquired k+N+1$^{th}$-frame picture, for example, the pixel coordinates of each feature point in the picture. Secondly, matching is performed between the k$^{th}$ feature point information and the k+N+1$^{th}$ feature point information to respectively obtain the k$^{th}$ feature point set and the k+N+1$^{th}$ feature point set, wherein the feature points in these two feature point sets are subjected to a pairwise corresponding relationship. Thirdly, the $k^{th}$ centroid information of the $k^{th}$ feature point set and the $k+N+1^{th}$ centroid information of the $k+N+1$ feature point set are respectively calculated according to the $k^{th}$ feature point set and the $k+N+1^{th}$ feature point set, wherein the feature information includes the pixel coordinates of the centroid in the picture; and lastly, the $k+N+1^{th}$-frame target prediction picture information and the position of the following target are predicted according to the $k^{th}$ centroid information, the $k+N+1^{th}$ centroid information and the central position information in the $k^{th}$-frame target picture information.

Figure 3:
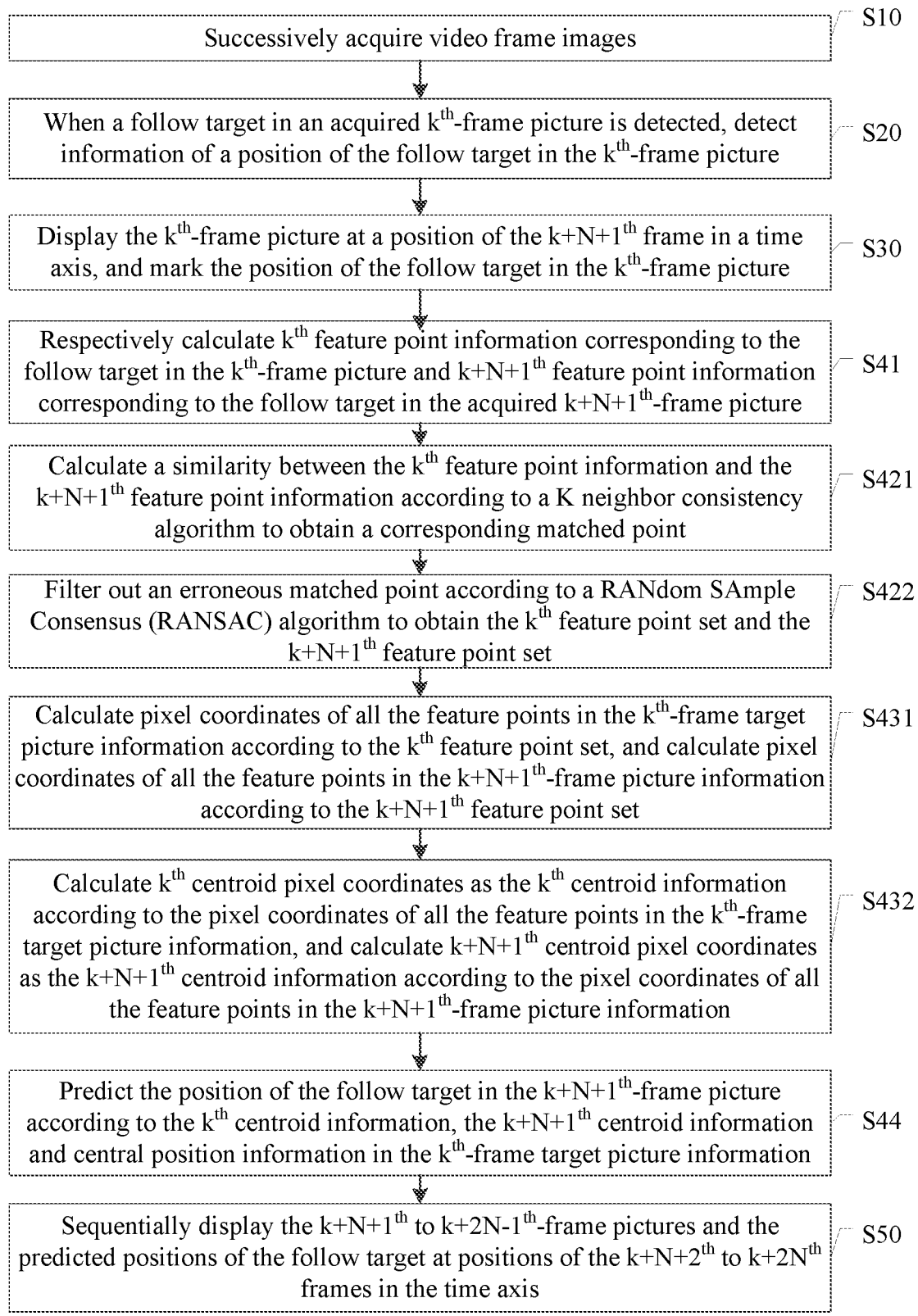
FIG. 3 is a flowchart of a method for displaying a target image based on a robot according to still another embodiment of the present disclosure.

As illustrated in FIG. 3, the present disclosure provides still another embodiment illustrating a method for displaying a target image based on a robot. The method includes:

S10: successively acquiring video frame images;

S20: when a following target in an acquired $k^{th}$-frame picture is detected, detecting information of a position of the following target in the $k^{th}$-frame picture;

S30: displaying the $k^{th}$-frame picture at a position of the $k+N+1^{th}$ frame in a time axis, and marking the position of the following target in the $k^{th}$-frame picture, N being the number of pictures acquired within a detection cycle;

S41: respectively calculating $k^{th}$ feature point information corresponding to the following target in the $k^{th}$-frame picture and $k+N+1^{th}$ feature point information corresponding to the following target in the acquired $k+N+1^{th}$-frame picture;

S421: calculating a similarity between the $k^{th}$ feature point information and the $k+N+1^{th}$ feature point information according to a K neighbor consistency algorithm to obtain a corresponding matched point;

S422: filtering out an erroneous matched point according to a RANdom SAmple Consensus (RANSAC) algorithm to obtain the $k^{th}$ feature point set and the $k+N+1^{th}$ feature point set;

S431: calculating pixel coordinates of all the feature points in the $k^{th}$-frame target picture information according to the $k^{th}$ feature point set, and calculating pixel coordinates of all the feature points in the $k+N+1^{th}$-frame picture information according to the $k+N+1^{th}$ feature point set;

S432: calculating $k^{th}$ centroid pixel coordinates as the $k^{th}$ centroid information according to the pixel coordinates of all the feature points in the $k^{th}$-frame target picture information, and calculating $k+N+1^{th}$ centroid pixel coordinates as the $k+N+1^{th}$ centroid information according to the pixel coordinates of all the feature points in the $k+N+1^{th}$-frame picture information;

S44: predicting the position of the following target in the $k+N+1^{th}$-frame picture according to the $k^{th}$ centroid information, the $k+N+1^{th}$ centroid information and central position information in the $k^{th}$-frame target picture information; and

S50: sequentially displaying the $k+N+1^{th}$ to $k+2N-1^{th}$-frame pictures and the predicted positions of the following target at positions of the $k+N+2^{th}$ to $k+2N^{th}$ frames in the time axis.

Specifically, based on the above embodiment, this embodiment mainly illustrates the process of how to match the $k^{th}$ feature point information with the $k+N+1^{th}$ feature point information to respectively obtain the $k^{th}$ feature point set and the $k+N+1^{th}$ feature point set; and the process of how to respectively calculate the k centroid information of the $k^{th}$ feature point set and the $k+N+1^{th}$ centroid information of the $k+N+1^{th}$ feature point set according to the $k^{th}$ feature point set and the $k+N+1^{th}$ feature point set.

Firstly, the $k^{th}$ feature point information corresponding to the $k^{th}$-frame target picture information and the $k+N^{th}$ feature point information corresponding to the acquired $k+N^{th}$-frame picture information are respectively calculated by using a feature point detection method. For example, the $k^{th}$ feature point information corresponding to the $k^{th}$-frame target picture information and the $k+N+1^{th}$ feature point information corresponding to the acquired $k+N+1^{th}$-frame picture information are obtained by using the FAST feature point detection method.

Secondly, the similarity between the $k^{th}$ feature point information and the $k+N+1^{th}$ feature point information is calculated according to the K neighbor consistency algorithm to obtain a corresponding matched point. In practice, two pictures are different from each other, and thus the calculated feature points are not absolutely the same. Therefore, the similarity between $k^{th}$ feature point information and the $k+N+1^{th}$ feature point information needs to be calculated according to the K neighbor consistency algorithm. When the two corresponding feature points reach a specified similarity, it is judged that these two corresponding feature points are effective feature points, such that the corresponding matched point of the two pictures is obtained. For example, assume that the $k^{th}$-frame picture includes three feature points A1, B1 and C1, and the $k+N+1^{th}$-frame picture includes three feature points A2, B2 and D2; then, according to the K neighbor consistency algorithm, if a feature point similarity between A1 and A2, and B1 and B2 satisfies a judgment criterion, it is judged that these feature points are the corresponding matched points; and if a feature point similarity between C1 and D2 does not satisfy the judgment criterion, it is judged that these feature points are not the corresponding matched points.

Thirdly, the erroneous matched point is filtered out according to the RANSAC algorithm to obtain the $k^{th}$ feature point set and the $k+N+1^{th}$ feature point set. In practice, the feature points calculated from the picture further includes some other feature points in the background picture in addition to the feature points of the following target. These additional feature points are not desired by the detection and prediction. Therefore, the erroneous matched points need to be filtered out according to the RANSAC algorithm to obtain correct feature points and obtain the $k^{th}$ feature point set and the $k+N+1^{th}$ feature point set.

Fourthly, the pixel coordinates of all the feature points in the $k^{th}$-frame target picture information and the pixel coordinates of all the feature points in the $k+N+1^{th}$-frame picture information are respectively calculated according to the $k^{th}$ feature point set and the $k+N+1^{th}$ feature point set. Based on the pixel coordinates, a coordinate system may be established by using one angle of the picture as a vertex, and then the position of each feature point in the coordinate system is calculated to obtain the pixel coordinates corresponding to each feature point.

Finally, the $k^{th}$ centroid pixel coordinates and the $k+N+1^{th}$ centroid pixel coordinates are calculated according to the pixel coordinates of all the feature points in the $k^{th}$-frame target picture information and the pixel coordinates of all the feature points in the $k+N+1^{th}$-frame picture information.

Figure 4:
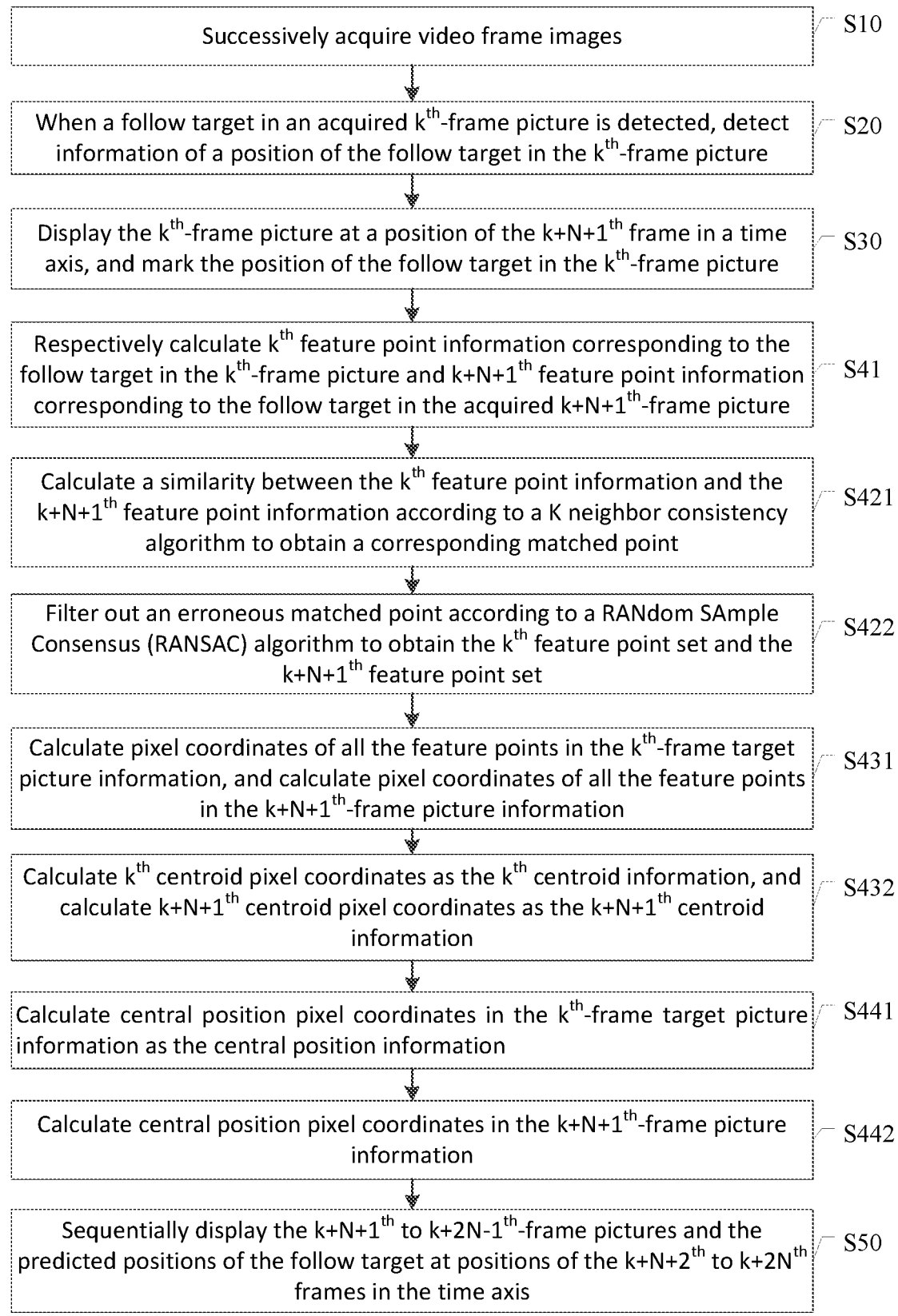
FIG. 4 is a flowchart of a method for displaying a target image based on a robot according to yet still another embodiment of the present disclosure.

As illustrated in FIG. 4, the present disclosure provides yet still another embodiment illustrating a method for displaying a target image based on a robot. The method includes:

S10: successively acquiring video frame images;

S20: when a following target in an acquired $k^{th}$-frame picture is detected, detecting information of a position of the following target in the $k^{th}$-frame picture;

S30: displaying the $k^{th}$-frame picture at a position of $k+N+1^{th}$ frame in a time axis, and marking the position of the following target in the $k^{th}$-frame picture, N being a number of pictures acquired within a detection cycle;

S41: respectively calculating $k^{th}$ feature point information corresponding to the following target in the $k^{th}$-frame picture and $k+N+1^{th}$ feature point information corresponding to the following target in the acquired $k+N+1^{th}$-frame picture;

S421: calculating a similarity between the $k^{th}$ feature point information and the $k+N+1^{th}$ feature point information according to a K neighbor consistency algorithm to obtain a corresponding matched point;

S422: filtering out an erroneous matched point according to a RANdom SAmple Consensus (RANSAC) algorithm to obtain the $k^{th}$ feature point set and the $k+N+1^{th}$ feature point set;

S431: calculating pixel coordinates of all the feature points in the $k^{th}$-frame target picture information according to the $k^{th}$ feature point set, and calculating pixel coordinates of all the feature points in the $k+N+1^{th}$-frame picture information according to the $k+N+1^{th}$ feature point set;

S432: calculating $k^{th}$ centroid pixel coordinates as the $k^{th}$ centroid information according to the pixel coordinates of all the feature points in the $k^{th}$-frame target picture information, and calculating $k+N+1^{th}$ centroid pixel coordinates as the $k+N+1^{th}$ centroid information according to the pixel coordinates of all the feature points in the $k+N+1^{th}$-frame picture information;

wherein in step S432, the $k^{th}$ centroid pixel coordinates are calculated based on the following formula:

$$C(k) = \frac{1}{i} \sum_{j=1}^{i} P(k)(j) \quad (1)$$

wherein $P(k)(j)$ denotes pixel coordinates of a $j^{th}$ feature point in the $k^{th}$ feature point set corresponding to the $k^{th}$-frame target picture, and $C(k)$ denotes the $k^{th}$ centroid pixel coordinates; and wherein in step S432, the $k+N+1^{th}$ centroid pixel coordinates are calculated based on the following formula:

$$C(k+N+1) = \frac{1}{i} \sum_{j=1}^{i} P(k+N+1)(j) \quad (2)$$

wherein $P(k+N+1)(j)$ denotes pixel coordinates of a $j^{th}$ feature point in the $k+N+1^{th}$ feature point set corresponding to the $k+N+1^{th}$-frame picture information, and $C(k+N+1)$ denotes the $k+N+1^{th}$ centroid pixel coordinates;

S441: calculating central position pixel coordinates in the $k^{th}$-frame target picture information as the central position information;

S442: calculating central position pixel coordinates in the $k+N+1^{th}$-frame picture information according to the $k^{th}$ centroid pixel coordinates, the $k+N+1^{th}$ centroid pixel coordinates and the central position pixel coordinates in the $k^{th}$-frame picture information based on the following formula:

$$R(k+N+1)=R(k)-C(k)+C(k+N+1) \quad (3)$$

wherein $R(k+N+1)$ denotes the central position pixel coordinates in the $k+N+1^{th}$-frame picture information, $R(k)$ denotes the central position pixel coordinates in the $k^{th}$-frame target picture information, $C(k)$ denotes the $k^{th}$ centroid pixel coordinates, and $C(k+N+1)$ denotes the $k+N+1^{th}$ centroid pixel coordinates; and S50: sequentially displaying the $k+N+1^{th}$ to $k+2N-1^{th}$-frame pictures and the predicted positions of the following target in the $k+N+2^{th}$ to $k+2N^{th}$ frames in the time axis.

Specifically, this embodiment illustrates in detail how to calculate the $k^{th}$ centroid pixel coordinates and the $k+N+1^{th}$ centroid pixel coordinates, and how to calculate the central position pixel coordinates in the $k+N+1^{th}$-frame picture information according to the $k^{th}$ centroid pixel coordinates, the $k+N+1^{th}$ centroid pixel coordinates and the central position pixel coordinates in the $k^{th}$-frame picture information.

Firstly, according to the above embodiment, after the pixel coordinates of all the feature points in the $k^{th}$-frame target picture information are calculated, the centroid pixel coordinates in the $k^{th}$-frame picture information may be calculated according to the formula in step S433. For example, it is calculated that the $k^{th}$-frame target picture information includes three feature points whose pixel coordinates are (2, 5), (1, 6) and (3, 7), and then the centroid pixel coordinates (2, 6) may be calculated according to the formula in step S433. Likewise, the centroid pixel coordinates in the $k+N+1^{th}$-frame picture information may also be calculated according to the formula in step S434.

Secondly, the pixel coordinates of the central position in the $k^{th}$-frame target picture information are calculated. Since during the prediction, the central coordinate position in the picture information and the centroid coordinate position in the picture are subject to an approximate relative distance. Herein, for convenience, an equal distance is employed, and therefore the formula in step S450 may be derived.

According to the formula in step S450, the central position pixel coordinates in the $k+N+1^{th}$-frame picture information may be calculated. The specific position of the following target in the $k+N+1^{th}$-frame picture may be calculated according to the central position pixel coordinates and the centroid coordinates of the following target, such that the $k+N+1^{th}$-frame picture information may be predicted. By using the above method, the positions of the following target in the $k+N+1^{th}$ to $k+2N+1^{th}$-frame pictures may be sequentially predicted.

Finally, upon the prediction, the robot may judge how the following target specifically moves, and adjust the position of the robot according to the detection result.

Figure 10:
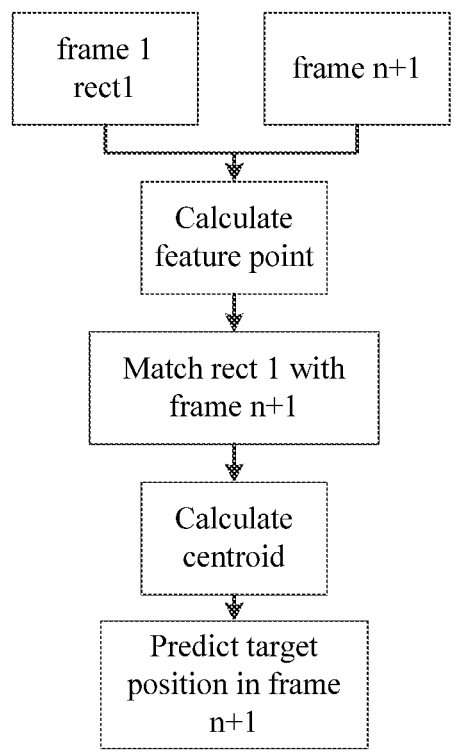
FIG. 10 is a flowchart of prediction steps in the method for displaying a target image based on a robot corresponding to FIG. 4 according to one embodiment of the present disclosure.
Figure 11:
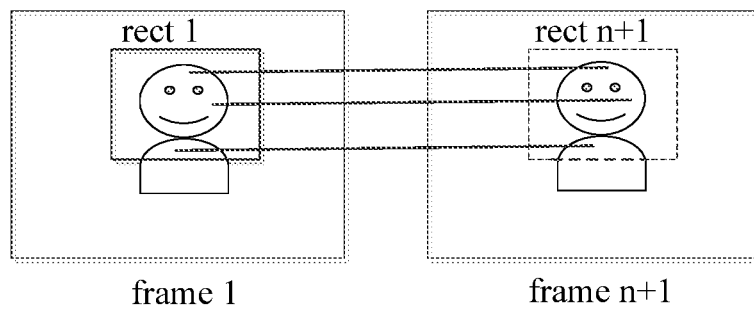
FIG. 11 is a diagram of an image matching relationship in the method for displaying a target image based on a robot corresponding to FIG. 4 according to one embodiment of the present disclosure.

As illustrated in FIG. 10 and FIG. 11, description is given by using a detection result rect 1 of a first frame, frame 1 (that is, frame 1 includes an upper part of a human body, for example, the small rectangular block in the left part of FIG. 11) and a second frame displayed in the acquired $n+1^{th}$-frame prediction as examples.

Firstly, the feature points in rect 1 and the feature points in the entire $n+1^{th}$-frame picture are respectively calculated, for example, the FAST feature points.

Secondly, the feature points in these two pictures are matched. The specific matching method: a feature point similarity between the two pictures according to the K neighbor consistency algorithm, and erroneous matched points are filtered out based on the RANSAC algorithm to finally obtain an inner point set P(1) of frame 1 and an inner point set P(n+1) of frame n+1. These two point sets are subject to a one-to-one matching relationship.

Thirdly, assume that the number of point sets is n, then the centroids of P(1) and P(n+1) are respectively calculated by using the formula in step S432; afterwards, the position of the upper part of the human body in the second-frame picture is predicted; and according to the fact that among the adjacent frames, the key central position of a target and the rectangular block central position of the target are always subject to an approximate relative distance, herein, for convenience, an equal distance is used. Therefore, the formula in step S442 may be obtained, and the rectangular block of rect n+1 is less than or equal to that of rect 1. As illustrated in the right part of FIG. 11, the predict result is the dotted-line rectangular block rect n+1, such that the display module may use the acquired n+1$^{th}$-frame picture and the predicted dotted-line rectangular block rect n+1 as the image displayed in the second frame.

Finally, when the acquisition module acquires a next frame, the above operations are repeatedly performed, and hence the position of the predicted upper part target may be continuously displayed.

During the processing of the prediction module, time is mainly elapsed in calculating the feature points, whereas calculation of the feature points needs sequentially comparing the points in the image with the pixel grayscale in the adjacent 3×3 region, and thus the processing speed is high (the comparison algorithm is simple). During the processing of the detection module, a convolution operation needs to be performed for a large number of pictures to extract the feature points. The convolution core has a maximum of several millions of parameters, and thus a large number of floating-point arithmetic operations are time consuming. Therefore, the processing speed of the prediction module is far higher than the detection speed of the detection speed.

Figure 5:
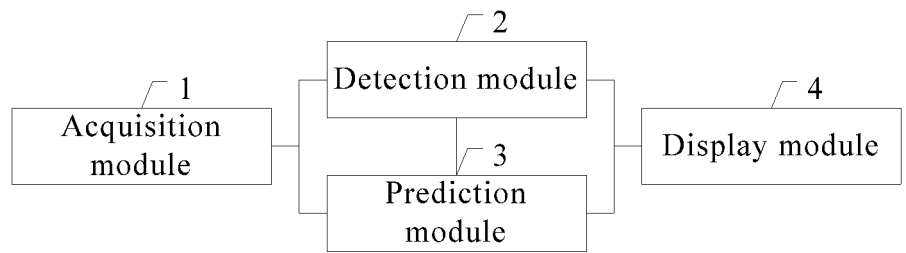
FIG. 5 is a schematic structural diagram of a system for displaying a target image based on a robot according to one embodiment of the present disclosure.

As illustrated in FIG. 5, the present disclosure provides one embodiment illustrating a system for displaying a target image based on a robot. The system includes:

an acquisition module 1, configured to successively acquire video frame images;

a detection module 2, electrically connected to the acquisition module 1, and configured to: when a following target in a k$^{th}$-frame picture of the acquired video frame images is detected, detect information of a position of the following target in the k$^{th}$-frame picture;

a display module 4, electrically connected to the detection module 2, and configured to display the k$^{th}$-frame picture at a k+N+1$^{th}$-frame in a time axis, and marking the position of the following target in the k$^{th}$-frame picture, N being the number of pictures acquired within a detection cycle; and a prediction module 3, electrically connected to the detection module 2, and configured to sequentially predict positions of the following target in acquired k+N+1$^{th}$ to k+2N−1$^{th}$-frame pictures according to the position information of the following target in the k$^{th}$-frame picture;

wherein the display module 4 is further configured to sequentially display the k+N+1$^{th}$ to k+2N−1$^{th}$-frame pictures and the predicted positions of the following target at k+N+2$^{th}$ to k+2N$^{th}$ frames in the time axis.

Specifically, the acquisition module may be composed of a camera mounted on the robot, and configured to acquire images of the following target. When the following target appears within the vision range of the robot, the robots starts successively acquiring pictures including the following target. When the N$^{th}$-frame picture information starts being acquired, the detection module of the robot has just detected the first-frame picture information and obtained first-frame target picture information, and the detected 1$^{st}$-frame target picture is displayed by the display module at the position of the N+1$^{th}$ frame in the time axis. Afterwards, the robot skips the detection of the N+2$^{th}$-frame picture information to the 2N$^{th}$-frame picture information, but directly detects the N+1$^{th}$-frame picture information, and displays the detected N+1$^{th}$-frame target picture information at the position of the 2N$^{th}$ frame in the time axis.

Since the robot successively acquires the picture information, after the first-frame picture information is detected and displayed, the second-frame target picture information is predicted according to the detected first-frame target picture information and the acquired N+1$^{th}$-frame picture information, and the predicted second-frame target picture information is displayed at the position of the N+2$^{th}$-frame in the time axis. By repeatedly implementing the above prediction function, the third-frame target picture information may be obtained, until the 2N−1$^{th}$-frame target picture information is predicted and displayed. By virtue of the prediction function according to this embodiment, the hopping and lagging in the prior art may be prevented.

Figure 6:
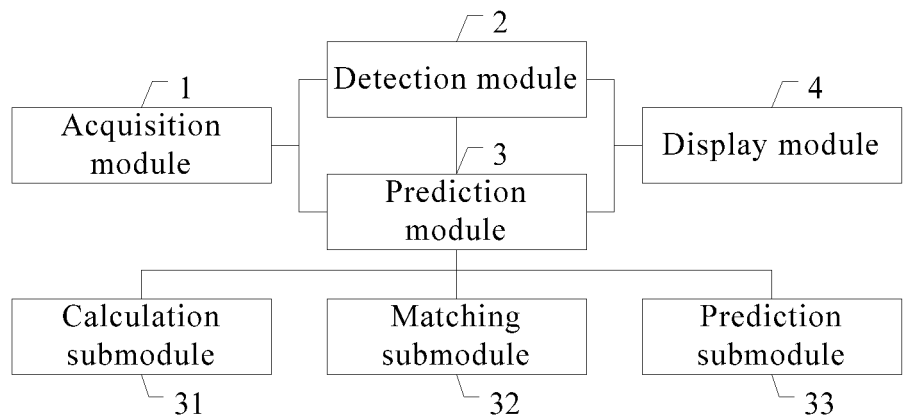
FIG. 6 is a schematic structural diagram of a system for displaying a target image based on a robot according to another embodiment of the present disclosure.

As illustrated in FIG. 6, the present disclosure provides another embodiment illustrating a system for displaying a target image based on a robot. The system includes:

an acquisition module 1, configured to successively acquire video frame images;

a detection module 2, electrically connected to the acquisition module 1, and configured to: when a following target in a k$^{th}$-frame picture of the acquired video frame images is detected, detect information of a position of the following target in the k$^{th}$-frame picture;

a display module 4, electrically connected to the detection module 2, and configured to display the k$^{th}$-frame picture at a k+N+1$^{th}$-frame in a time axis, and marking the position of the following target in the k$^{th}$-frame picture, N being the number of pictures acquired within a detection cycle; and a prediction module 3, electrically connected to the detection module 2, and configured to sequentially predict positions of the following target in acquired k+N+1$^{th}$ to k+2N−1$^{th}$-frame pictures according to the position information of the following target in the k$^{th}$-frame picture;

wherein the display module 4 is further configured to sequentially display the k+N+1$^{th}$ to k+2N−1$^{th}$-frame pictures and the predicted positions of the following target at k+N+2$^{th}$ to k+2N$^{th}$ frames in the time axis.

The prediction module 3 includes:

a calculation submodule 31, configured to respectively calculate k$^{th}$ feature point information corresponding to the following target in the k$^{th}$-frame picture and k+N+1$^{th}$ feature point information corresponding to the following target in the acquired k+N+1$^{th}$-frame picture;

a matching submodule 32, electrically connected to the calculation submodule 31, and configured to match the k$^{th}$ feature point information with the k+N+1$^{th}$ feature point information to respectively obtain a k$^{th}$ feature point set and a k+N+1$^{th}$ feature point set;

wherein the calculation submodule 31 is further configured to calculate k$^{th}$ centroid information of the k$^{th}$ feature point set according to the k$^{th}$ feature point set, and calculating k+N+1$^{th}$ centroid information of the k+N+1$^{th}$ feature point set according to the k+N+1$^{th}$ feature point set; and a prediction submodule 33, configured to predict k+1$^{th}$-frame target picture prediction information according to the k$^{th}$ centroid information, the k+N+1$^{th}$ centroid information and central position information in the k$^{th}$-frame target picture information.

In this embodiment, how to predict the position of the following target in the k+N+1$^{th}$-frame picture according to the detected k$^{th}$-frame target picture information and the acquired k+N+1$^{th}$-frame picture information is specifically described. Firstly, the image processing module employs some conventional methods for processing feature points in pictures to respectively obtain the k$^{th}$ feature point information corresponding to the k$^{th}$-frame target picture information and the k+N+1$^{th}$ feature point information corresponding to the acquired k+N+1$^{th}$-frame picture information, for example, the pixel coordinates of each feature point in the picture. Secondly, matching is performed between the $k^{th}$ feature point information and the $k+N+1^{th}$ feature point information to respectively obtain the $k^{th}$ feature point set and the $k+N+1^{th}$ feature point set, wherein the feature points in these two feature point sets are subjected to a pairwise corresponding relationship. Thirdly, the calculation module respectively calculates the $k^{th}$ centroid information of the $k^{th}$ feature point set and the $k+N+1^{th}$ centroid information of the $k+N+1^{th}$ feature point set are respectively calculated according to the $k^{th}$ feature point set and the $k+N+1^{th}$ feature point set, wherein the feature information includes the pixel coordinates of the centroid in the picture; and lastly, the $k+N+1^{th}$-frame target prediction picture information is predicted according to the $k^{th}$ centroid information, the $k+N+1^{th}$ centroid information and the central position information in the $k^{th}$-frame target picture information.

Figure 7:
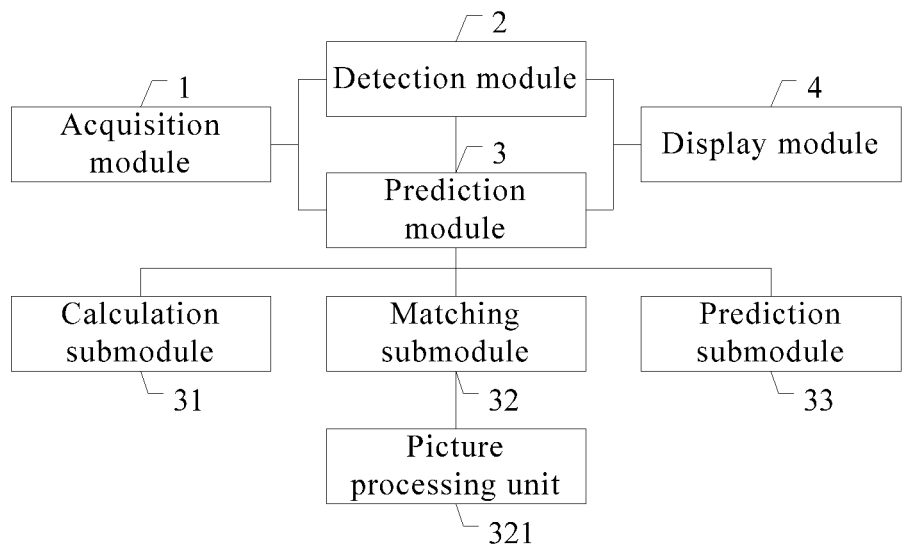
FIG. 7 is a schematic structural diagram of a system for displaying a target image based on a robot according to still another embodiment of the present disclosure.

As illustrated in FIG. 7, the present disclosure provides still another embodiment illustrating a system for displaying a target image based on a robot. The system includes:

an acquisition module 1, configured to successively acquire video frame images;

a detection module 2, electrically connected to the acquisition module 1, and configured to: when a following target in a $k^{th}$-frame picture of the acquired video frame images is detected, detect information of a position of the following target in the $k^{th}$-frame picture;

a display module 4, electrically connected to the detection module 2, and configured to display the $k^{th}$-frame picture at a $k+N+1^{th}$-frame in a time axis, and marking the position of the following target in the $k^{th}$-frame picture, N being the number of pictures acquired within a detection cycle; and a prediction module 3, electrically connected to the detection module 2, and configured to sequentially predict positions of the following target in acquired $k+N+1^{th}$ to $k+2N-1^{th}$-frame pictures according to the position information of the following target in the $k^{th}$-frame picture;

wherein the display module 4 is further configured to sequentially display the $k+N+1^{th}$ to $k+2N-1^{th}$-frame pictures and the predicted positions of the following target at $k+N+2^{th}$ to $k+2N^{th}$ frames in the time axis.

The prediction module 3 includes:

a calculation submodule 31, configured to respectively calculate $k^{th}$ feature point information corresponding to the following target in the $k^{th}$-frame picture and $k+N+1^{th}$ feature point information corresponding to the following target in the acquired $k+N+1^{th}$-frame picture;

a matching submodule 32, electrically connected to the calculation submodule 31, and configured to match the $k^{th}$ feature point information with the $k+N+1^{th}$ feature point information to respectively obtain a $k^{th}$ feature point set and a $k+N+1^{th}$ feature point set;

wherein the calculation submodule 31 is further configured to calculate $k^{th}$ centroid information of the $k^{th}$ feature point set according to the $k^{th}$ feature point set, and calculating $k+N+1^{th}$ centroid information of the $k+N+1^{th}$ feature point set according to the $k+N+1^{th}$ feature point set; and a prediction submodule 33, configured to predict $k+1^{th}$-frame target prediction picture information according to the $k^{th}$ centroid information, the $k+N+1^{th}$ centroid information and central position information in the $k^{th}$-frame target picture information.

The matching submodule 32 includes:

a picture processing unit 321, configured to calculate a similarity between the $k^{th}$ feature point information and the $k+N+1^{th}$ feature point information according to a K neighbor consistency algorithm to obtain a corresponding matched point;

wherein the picture processing unit 321 is further configured to filter out an erroneous matched point according to a RANdom SAmple Consensus (RANSAC) algorithm to obtain the $k^{th}$ feature point set and the $k+N+1^{th}$ feature point set.

The calculation submodule 31 is further configured to calculate pixel coordinates of all the feature points in the $k^{th}$-frame target picture information according to the $k^{th}$ feature point set, and calculate pixel coordinates of all the feature points in the $k+N+1^{th}$-frame picture information according to the $k+N+1^{th}$ feature point set.

The calculation submodule 31 is further configured to calculate $k^{th}$ centroid pixel coordinates as the $k^{th}$ centroid information according to the pixel coordinates of all the feature points in the $k^{th}$-frame target picture information, and calculate $k+N^{th}$ pixel coordinates as the $k+N+1^{th}$ centroid information according to the pixel coordinates of all the feature points in the $k+N+1^{th}$-frame picture information.

The calculation submodule is further configured to calculate the $k^{th}$ centroid pixel coordinates based on the following formula:

$$C(k) = \frac{1}{i}\sum_{j=1}^{i} P(k)(j) \qquad (1)$$

wherein $P(k)(j)$ denotes pixel coordinates of a $j^{th}$ feature point in the $k^{th}$ feature point set corresponding to the $k^{th}$-frame target picture, and $C(k)$ denotes the $k^{th}$ centroid pixel coordinates.

The calculation submodule is further configured to calculate the $k+N+1^{th}$ centroid pixel coordinates based on the following formula:

$$C(k+N+1) = \frac{1}{i}\sum_{j=1}^{i} P(k+N+1)(j) \qquad (2)$$

wherein $P(k+N+1)(j)$ denotes pixel coordinates of a $j^{th}$ feature point in the $k+N+1^{th}$ feature point set corresponding to the $k+N+1^{th}$-frame picture information, and $C(k+N+1)$ denotes the $k+N+1^{th}$ centroid pixel coordinates.

The calculation submodule 31 is further configured to calculate central position pixel coordinates in the $k^{th}$-frame target picture information as the central position information.

The calculation submodule 31 is further configured to calculate central position pixel coordinates in the $k+N+1^{th}$-frame picture information according to the $k^{th}$ centroid pixel coordinates, the $k+N+1^{th}$ centroid pixel coordinates and the central position pixel coordinates in the $k^{th}$-frame target picture information based on the following formula:

$$R(k+N+1)=R(k)-C(k)+C(k+N+1) \qquad (3)$$

wherein $R(k+N+1)$ denotes the central position pixel coordinates in the $k+N+1^{th}$-frame picture information, $R(k)$ denotes the central position pixel coordinates in the $k^{th}$-frame target picture information, $C(k)$ denotes the $k^{th}$ centroid pixel coordinates, and $C(k+N+1)$ denotes the $k+N+1^{th}$ centroid pixel coordinates.

Specifically, this embodiment illustrates in detail how to calculate the $k^{th}$ centroid pixel coordinates and the $k+N+1^{th}$ centroid pixel coordinates, and how to calculate the central position pixel coordinates in the $k+N+1^{th}$-frame picture information according to the $k^{th}$ centroid pixel coordinates, the k+N+1$^{th}$ centroid pixel coordinates and the central position pixel coordinates in the k$^{th}$-frame picture information.

Specifically, this embodiment mainly illustrates the process of how to match the k$^{th}$ feature point information with the k+N+1$^{th}$ feature point information to respectively obtain the k$^{th}$ feature point set and the k+N+1$^{th}$ feature point set; and the process of how to respectively calculate the k centroid information of the k$^{th}$ feature point set and the k+N+1$^{th}$ centroid information of the k+N+1$^{th}$ feature point set according to the k$^{th}$ feature point set and the k+N+1$^{th}$ feature point set.

Firstly, the matching submodule may respectively obtain the k$^{th}$ feature point information corresponding to the k$^{th}$-frame target picture information and the k+N+1$^{th}$ feature point information corresponding to the acquired k+N+1$^{th}$-frame picture information by using a feature point detection method. For example, the k$^{th}$ feature point information corresponding to the k$^{th}$-frame target picture information and the k+N+1$^{th}$ feature point information corresponding to the acquired k+N+1$^{th}$-frame picture information are obtained by using the FAST feature point detection method.

Secondly, the similarity between the k$^{th}$ feature point information and the k+N+1$^{th}$ feature point information is calculated according to the K neighbor consistency algorithm, and thus the picture processing module may obtain a corresponding matched point. In practice, two pictures are different from each other, and thus the calculated feature points are not absolutely the same. Therefore, the similarity between k$^{th}$ feature point information and the k+N+1$^{th}$ feature point information needs to be calculated according to the K neighbor consistency algorithm, such that the corresponding matched point of the two pictures is obtained.

Thirdly, the erroneous matched point is filtered out according to the RANSAC algorithm to obtain the k$^{th}$ feature point set and the k+N+1$^{th}$ feature point set. In practice, the feature points calculated from the picture further includes some other feature points in the background picture in addition to the feature points of the following target. These additional feature points are not desired by the detection and prediction. Therefore, the erroneous matched points need to be filtered out according to the RANSAC algorithm to obtain correct feature points, that is obtain the k$^{th}$ feature point set and the k+N+1$^{th}$ feature point set.

Fourthly, the pixel coordinates of all the feature points in the k$^{th}$-frame target picture information and the pixel coordinates of all the feature points in the k+N+1$^{th}$-frame picture information are respectively calculated according to the k$^{th}$ feature point set and the k+N+1$^{th}$ feature point set. Based on the pixel coordinates, a coordinate system may be established by using one angle of the picture as a vertex, and then the position of each feature point in the coordinate system is calculated to obtain the pixel coordinates corresponding to each feature point.

Finally, the k$^{th}$ centroid pixel coordinates and the k+N+1$^{th}$ centroid pixel coordinates are calculated according to the pixel coordinates of all the feature points in the k$^{th}$-frame target picture information and the pixel coordinates of all the feature points in the k+N+1$^{th}$-frame picture information.

In this embodiment, after the pixel coordinates of all the feature points in the k$^{th}$-frame target picture information are calculated, the centroid pixel coordinates in the k$^{th}$-frame picture information may be calculated according to the formula in step S433. For example, it is calculated that the k$^{th}$-frame target picture information includes three feature points whose pixel coordinates are (2, 5), (1, 6) and (3, 7), and then the centroid pixel coordinates (2, 6) may be calculated according to the formula. Likewise, the centroid pixel coordinates in the k+N$^{th}$-frame picture information may also be calculated according to the formula in step S434.

Afterwards, the pixel coordinates of the central position in the k$^{th}$-frame target picture information are calculated. Since during the prediction, the central coordinate position in the picture information and the centroid coordinate position in the picture are subject to an approximate relative distance. Herein, for convenience, an equal distance is employed, and therefore the formula R(k)−C(k)=R(k+N+1)−C(k+N+1) may be derived such that the formula R(k+N+1)=R(k)−C(k)−C(k+N+1) may be derived.

According to the formula in step S450, the central position pixel coordinates in the k+N+1$^{th}$-frame picture information may be calculated. The specific position of the k+N+1$^{th}$-frame picture information may be calculated according to the central position pixel coordinates of the k+N+1$^{th}$-frame picture information, such that the position of the following target in the k+N+1$^{th}$-frame picture may be predicted. By using the above method, the k+N+2$^{th}$-frame target prediction picture information to the k+2N−1$^{th}$-frame target prediction picture information may also be predicted.

It should be noted that the above embodiments may be freely combined according to actual needs. Described above are preferred embodiments of the present disclosure. It should be noted that persons of ordinary skill in the art may derive other improvements or polishments without departing from the principles of the present disclosure. Such improvements and polishments shall be deemed as falling within the protection scope of the present disclosure.

What is claimed is:

1. A method for displaying a target image based on a robot, comprising the following steps:
   S10: successively acquiring video frame images;
   S20: when a following target in an acquired k$^{th}$-frame picture is detected, detecting information of a position of the following target in the k$^{th}$-frame picture;
   S30: displaying the k$^{th}$-frame picture at a position of k+N+1$^{th}$-frame in a time axis, and marking the position of the following target in the k$^{th}$-frame picture, N being a number of pictures acquired within a detection cycle;
   S40: sequentially predicting positions of the following target in acquired k+N+1$^{th}$ to k+2N−1$^{th}$-frame pictures according to the position information of the following target in the k$^{th}$-frame picture; and
   S50: sequentially displaying the k+N+1$^{th}$ to k+2N−1$^{th}$-frame pictures and the predicted positions of the following target in the k+N+2$^{th}$ to k+2N$^{th}$ frames in the time axis.

2. The method for displaying a target image based on a robot according to claim 1, wherein the sequentially predicting positions of the following target in acquired k+N+1$^{th}$ to k+2N−1$^{th}$-frame pictures according to the position information of the following target in the k$^{th}$-frame picture in step S40 comprises:
   predicting the position of the following target in the k+N+1$^{th}$ frame picture according to the position of the following target in the k$^{th}$-frame picture, and predicting the position of the following target in the k+N+i+1$^{th}$-frame picture according to the position of the following target in the k+N+i$^{th}$-frame picture; wherein i is a positive integer in the range of 1 to N−2.

3. The method for displaying a target image based on a robot according to claim 1, further comprising:
   while displaying the k$^{th}$-frame picture in step S30, detecting the acquired k+N$^{th}$-frame picture, and upon step S50, displaying the k+N$^{th}$-frame picture and the detected position of the following target in the $k+2N+1^{th}$-frame picture in the time axis.

4. The method for displaying a target image based on a robot according to claim 1, wherein the predicting the position of the following target in the $k+N+1^{th}$-frame picture according to the position of the following target in the $k^{th}$-frame picture comprises:

S41: respectively calculating $k^{th}$ feature point information corresponding to the following target in the $k^{th}$-frame picture and $k+N+1^{th}$ feature point information corresponding to the following target in the acquired $k+N+1^{th}$-frame picture;

S42: matching the $k^{th}$ feature point information with the $k+N+1^{th}$ feature point information to respectively obtain a $k^{th}$ feature point set and a $k+N+1^{th}$ feature point set;

S43: calculating $k^{th}$ centroid information of the $k^{th}$ feature point set according to the $k^{th}$ feature point set, and calculating $k+N+1^{th}$ centroid information of the $k+N+1^{th}$ feature point set according to the $k+N+1^{th}$ feature point set; and S44: predicting the position of the following target in the $k+N+1^{th}$-frame picture according to the $k^{th}$ centroid information, the $k+N+1^{th}$ centroid information and central position information in the $k^{th}$-frame target picture information.

5. The method for displaying a target image based on a robot according to claim 4, wherein the matching the $k^{th}$ feature point information with the $k+N+1^{th}$ feature point information to respectively obtain a $k^{th}$ feature point set and a $k+N+1^{th}$ feature point set in step S42 comprises:

S421: calculating a similarity between the $k^{th}$ feature point information and the $k+N+1^{th}$ feature point information according to a K neighbor consistency algorithm to obtain a corresponding matched point; and S422: filtering out an erroneous matched point according to a RANdom SAmple Consensus (RANSAC) algorithm to obtain the $k^{th}$ feature point set and the $k+N+1^{th}$ feature point set.

6. The method for displaying a target image based on a robot according to claim 4, wherein the calculating $k^{th}$ centroid information of the $k^{th}$ feature point set according to the $k^{th}$ feature point set, and calculating $k+N+1^{th}$ centroid information of the $k+N+1^{th}$ feature point set according to the $k+N+1^{th}$ feature point set in step S43 comprises:

S431: calculating pixel coordinates of all the feature points in the $k^{th}$-frame target picture information according to the $k^{th}$ feature point set, and calculating pixel coordinates of all the feature points in the $k+N+1^{th}$-frame picture information according to the $k+N+1^{th}$ feature point set; and S432: calculating $k^{th}$ centroid pixel coordinates as the $k^{th}$ centroid information according to the pixel coordinates of all the feature points in the $k^{th}$-frame target picture information, and calculating $k+N+1^{th}$ centroid pixel coordinates as the $k+N+1^{th}$ centroid information according to the pixel coordinates of all the feature points in the $k+N+1^{th}$-frame picture information.

7. The method for displaying a target image based on a robot according to claim 6, wherein in step S432, the $k^{th}$ centroid pixel coordinates are calculated based on the following formula:

$$C(k) = \frac{1}{i}\sum_{j=1}^{i} P(k)(j)$$

wherein $P(k)(j)$ denotes pixel coordinates of a $j^{th}$ feature point in the $k^{th}$ feature point set corresponding to the $k^{th}$-frame target picture, and $C(k)$ denotes the $k^{th}$ centroid pixel coordinates; and in step S432, the $k+N+1^{th}$ centroid pixel coordinates are calculated based on the following formula:

$$C(k+N+1) = \frac{1}{i}\sum_{j=1}^{i} P(k+N+1)(j)$$

wherein $P(k+N+1)(j)$ denotes pixel coordinates of a $j^{th}$ feature point in the $k+N+1^{th}$ feature point set corresponding to the $k+N+1^{th}$-frame picture information, and $C(k+N+1)$ denotes the $k+N+1^{th}$ centroid pixel coordinates.

8. The method for displaying a target image based on a robot according to claim 7, wherein the predicting the position of the following target in the $k+N+1^{th}$-frame picture in step S44 comprises:

S441: calculating central position pixel coordinates in the $k^{th}$-frame target picture information as the central position information; and S442: calculating central position pixel coordinates in the $k+N+1^{th}$-frame picture information according to the $k^{th}$ centroid pixel coordinates, the $k+N+1^{th}$ centroid pixel coordinates and the central position pixel coordinates in the $k^{th}$-frame picture information based on the following formula:

$$R(k+N+1) = R(k) - C(k) + C(k+N+1)$$

wherein $R(k+N+1)$ denotes the central position pixel coordinates in the $k+N+1^{th}$-frame picture information, $R(k)$ denotes the central position pixel coordinates in the $k^{th}$-frame target picture information, $C(k)$ denotes the $k^{th}$ centroid pixel coordinates, and $C(k+N+1)$ denotes the $k+N+1^{th}$ centroid pixel coordinates.

9. A system for displaying a target image based on a robot, comprising:

an acquisition module, configured to successively acquire video frame images;

a detection module, electrically connected to the acquisition module, and configured to: when a following target in an acquired $k^{th}$-frame picture is detected, detect information of a position of the following target in the $k^{th}$-frame picture;

a display module, electrically connected to the detection module, and configured to display the $k^{th}$-frame picture at a $k+N+1^{th}$-frame in a time axis, and marking the position of the following target in the $k^{th}$-frame picture, N being a number of pictures acquired within a detection cycle; and a prediction module, electrically connected to the detection module, and configured to sequentially predict positions of the following target in acquired $k+N+1^{th}$ to $k+2N-1^{th}$-frame pictures according to the position information of the following target in the $k^{th}$-frame picture;

wherein the display module is further configured to sequentially display the $k+N+1^{th}$ to $k+2N-1^{th}$-frame pictures and the predicted positions of the following target in the $k+N+2^{th}$ to $k+2N^{th}$-frame pictures in the time axis.

10. The system for displaying a target image based on a robot according to claim 9, wherein the prediction module is further configured to predict the position of the following target in the k+N+1$^{th}$ frame according to the position of the following target in the k$^{th}$-frame picture, and predicting the position of the following target in the k+N+i+1$^{th}$ frame according to the position of the following target in the k+N+i$^{th}$ frame; wherein i is a positive integer in the range of 1 to N−2.

11. The system for displaying a target image based on a robot according to claim 9, wherein
the detection module is further configured to detect the acquired k+N$^{th}$-frame picture while displaying the k$^{th}$-frame picture; and
the display module is further configured to display the k+N$^{th}$-frame picture in the k+2N+1$^{th}$-frame picture and the detected position of the following target in the time axis.

12. The system for displaying a target image based on a robot according to claim 9, wherein the prediction module comprises:
a calculation submodule, configured to respectively calculate k$^{th}$ feature point information corresponding to the following target in the k$^{th}$-frame picture and k+N+1$^{th}$ feature point information corresponding to the following target in the acquired k+N+1$^{th}$-frame picture;
a matching submodule, electrically connected to the calculation submodule, and configured to match the k$^{th}$ feature point information with the k+N+1$^{th}$ feature point information to respectively obtain a k$^{th}$ feature point set and a k+N+1$^{th}$ feature point set;
wherein the calculation submodule is further configured to calculate k$^{th}$ centroid information of the k$^{th}$ feature point set according to the k$^{th}$ feature point set, and calculating k+N+1$^{th}$ centroid information of the k+N+1$^{th}$ feature point set according to the k+N+1$^{th}$ feature point set; and
a prediction submodule, configured to predict k+1$^{th}$-frame target prediction picture information according to the k$^{th}$ centroid information, the k+N+1$^{th}$ centroid information and central position information in the k$^{th}$-frame target picture information.

13. The system for displaying a target image based on a robot according to claim 12, wherein the matching submodule comprises:
a picture processing unit, configured to calculate a similarity between the k$^{th}$ feature point information and the k+N+1$^{th}$ feature point information according to a K neighbor consistency algorithm to obtain a corresponding matched point;
wherein the picture processing unit is further configured to filter out an erroneous matched point according to a RANdom SAmple Consensus (RANSAC) algorithm to obtain the k$^{th}$ feature point set and the k+N+1$^{th}$ feature point set.

14. The system for displaying a target image based on a robot according to claim 12, wherein
the calculation submodule is further configured to calculate pixel coordinates of all the feature points in the k$^{th}$-frame target picture information according to the k$^{th}$ feature point set, and calculate pixel coordinates of all the feature points in the k+N+1$^{th}$-frame picture information according to the k+N+1$^{th}$ feature point set; and
the calculation submodule is further configured to calculate k$^{th}$ centroid pixel coordinates as the k$^{th}$ centroid information according to the pixel coordinates of all the feature points in the k$^{th}$-frame target picture information, and calculate k+N+1$^{th}$ pixel coordinates as the k+N+1$^{th}$ centroid information according to the pixel coordinates of all the feature points in the k+N+1$^{th}$-frame picture information.

15. The system for displaying a target image based on a robot according to claim 14, wherein
the calculation submodule is further configured to calculate the k$^{th}$ centroid pixel coordinates based on the following formula:

$$C(k) = \frac{1}{i} \sum_{j=1}^{i} P(k)(j)$$

wherein P(k)(j) denotes pixel coordinates of a j$^{th}$ feature point in the k$^{th}$ feature point set corresponding to the k$^{th}$-frame target picture, and C(k) denotes the k$^{th}$ centroid pixel coordinates; and
the calculation submodule is further configured to calculate the k+N+1$^{th}$ centroid pixel coordinates based on the following formula:

$$C(k+N+1) = \frac{1}{i} \sum_{j=1}^{i} P(k+N+1)(j)$$

wherein P(k+N+1)(j) denotes pixel coordinates of a j$^{th}$ feature point in the k+N+1$^{th}$ feature point set corresponding to the k+N+1$^{th}$-frame picture information, and C(k+N+1) denotes the k+N+1$^{th}$ centroid pixel coordinates.

16. The system for displaying a target image based on a robot according to claim 15, wherein
the calculation submodule is further configured to calculate central position pixel coordinates in the k$^{th}$-frame target picture information as the central position information;
the calculation submodule is further configured to calculate central position pixel coordinates in the k+N+1$^{th}$-frame picture information according to the k$^{th}$ centroid pixel coordinates, the k+N+1$^{th}$ centroid pixel coordinates and the central position pixel coordinates in the k$^{th}$-frame picture information based on the following formula:

R(k+N+1)=R(k)−C(k)+C(k+N+1)

wherein R(k+N+1) denotes the central position pixel coordinates in the k+N+1$^{th}$-frame picture information, R(k) denotes the central position pixel coordinates in the k$^{th}$-frame target picture information, C(k) denotes the k$^{th}$ centroid pixel coordinates, and C(k+N+1) denotes the k+N+1$^{th}$ centroid pixel coordinates.

* * * * *